C. CARSON.
COMBINED TACHOMETER AND REVOLUTION COUNTER.
APPLICATION FILED SEPT. 24, 1918.
1,297,793.
Patented Mar. 18, 1919.
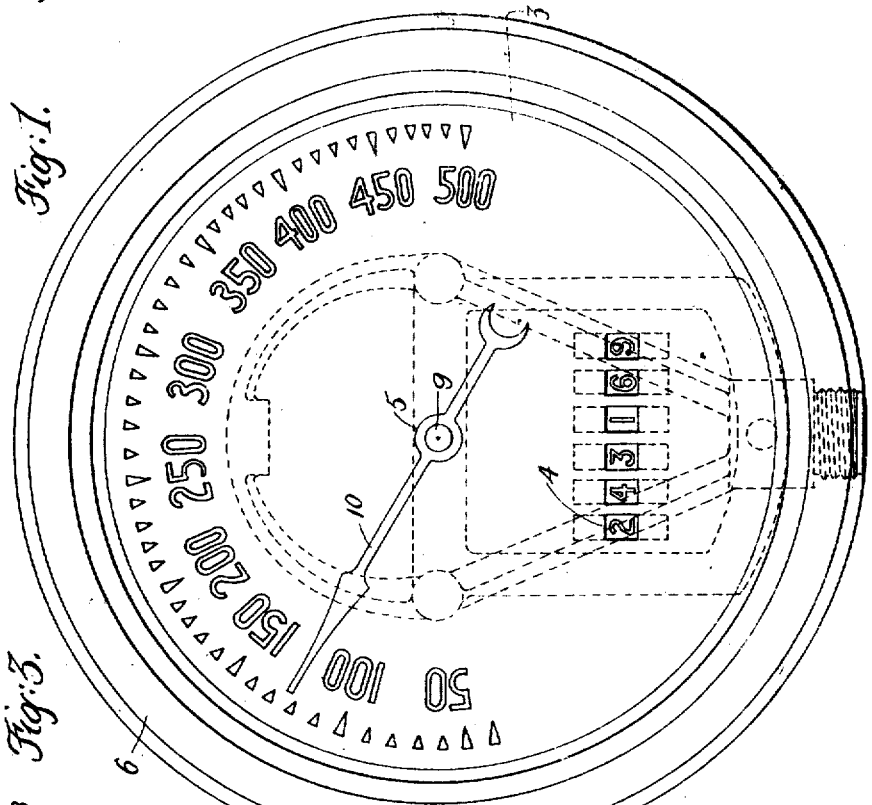
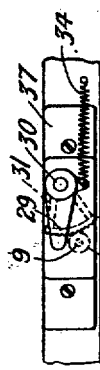
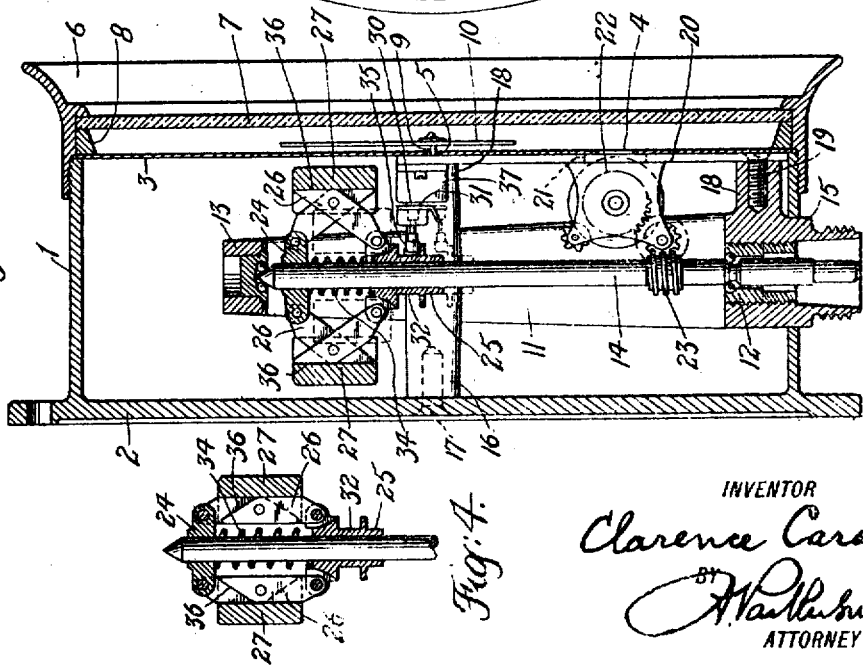
INVENTOR
Clarence Carson
BY
ATTORNEY

UNITED STATES PATENT OFFICE.

CLARENCE CARSON, OF NEW ROCHELLE, NEW YORK, ASSIGNOR TO H. W. JOHNS-MANVILLE COMPANY, A CORPORATION OF NEW YORK.

COMBINED TACHOMETER AND REVOLUTION-COUNTER.

1,297,793.  Specification of Letters Patent.  Patented Mar. 18, 1919.

Application filed September 24, 1918. Serial No. 255,526.

*To all whom it may concern:*

Be it known that I, CLARENCE CARSON, a citizen of the United States of America, residing at Sutton Manor, New Rochelle, county of Westchester, State of New York, have invented certain new and useful Improvements in Combined Tachometers and Revolution-Counters, of which the following is a specification.

My invention relates to tachometers and is specifically designed to produce a compact construction of combined tachometer and revolution counting mechanism mounted on a unitary frame and particularly serviceable in recording and indicating the propeller revolutions of submarines or other marine craft or of a flying machine, or of any revolving body. The best form of apparatus at present known to me embodying my invention is illustrated in the accompanying sheet of drawings in which—

Figure 1 is a face view of the apparatus;

Fig. 2 is a vertical axial section;

Fig. 3 is a detail of the tachometer index shaft operating mechanism, and

Fig. 4 is a detail of the governor links of the tachometer shaft in their relative positions when the apparatus is at rest.

Throughout this specification like reference characters indicate like parts. 1, is the cylindrical casing of the instrument, preferably having its back plate 2, formed integral with the cylindrical or barrel portion. 3, is the dial plate on which are suitable divisions and figures representing the number of revolutions per minute or other predetermined period. This dial face has a slot 4, or a series of slots in line, or other form of aperture through which may be seen the numerals of the counting mechanism 22. The dial plate also has the usual central opening 5, through which may project the tachometer pointer shaft 9, carrying the index finger or pointer 10. A glass plate 7, is held over the dial and index finger by retaining ring 6, and spacing ring or bezel 8.

The tachometer and counting mechanisms are mounted upon the main frame 11, which has a lower bearing 12, and an upper bearing 13, for supporting the main tachometer shaft 14, in a vertical position. This frame 11, has a projecting boss 15, to which the coupling of a flexible tube containing a flexible shaft or other driving means may be attached so that rotation may be imparted to the tachometer shaft 14. This boss, as shown in Fig. 2, projects outwardly through an opening in the casing 1. The frame 11, has suitable rearwardly projecting lugs 16, 16, adapted to bear on the back plate of the casing 1, and when fastened thereto by any proper means such as screws, one of which is shown at 17, in dotted lines in Fig. 2, hold the frame 11, in proper position in the casing. 18, 18, are forwardly projecting lugs similarly adapted to be fastened by screws 19, to the plate 20, of the counting mechanism. This plate 20, is of suitable shape, as indicated in Fig. 1, with an opening or slot 21, registering with or located behind the slot 4, in the dial face.

22, is the counter mechanism usually of standard construction mounted on the back of the plate 20, and so located that the numerals of the counter can be seen through openings 4, and 21. Any suitable form of helical or other gearing 23, connects the counter mechanism with the main tachometer shaft 14.

The tachometer mechanism proper consists of a fixed collar 24, on the upper end of the shaft 14, and a sliding collar 25, connected together by jointed links 26, 26, which latter are also connected to the centrifugal governor weights 27, 27. A spiral compression spring 34, is confined between collars 24 and 25, normally tending to separate the same. The sliding collar 25, has an external circumferential groove 32, in which rides the anti-friction roller 35, carried by crank 31, which is carried by shaft 30, journaled in a housing 37 in the rear of plate 20. This shaft 30, carries toothed sector 29, which meshes with pinion 28, on the tachometer pointer shaft 9. A light spiral spring 34, is fastened to a lug on the under side of the toothed sector 29, at one end and to the plate 20, at the other end.

The tachometer links 26, 26, have their inner ends which are pivoted together and to the weights 27, 27, extended beyond the pivotal points and have outer beveled faces of similar angles of inclination to the axes of the links so that when the links of each pair swing toward one another through a certain angle, as indicated in Fig. 2, these beveled faces 36, will come to a bearing against the inner faces of the weights 27, 27, and prevent further outward movement of said weights, and consequently further action of the centrifugal governor mechanism.

The method of operation of my invention is as follows: When the parts are at rest the force of gravity acting on weights 27, 27, and the resiliency of spring 34 tend to keep the sliding collar 25, in its lowermost position with the result that the index finger 10, points at zero. The spring 33, also tends to secure the above stated result and takes up lost motion in the connections. When the main tachometer shaft 14, is rotated centrifugal action of the weights 27, causes them to fly outwardly lifting sliding collar 25, turning crank 31, and toothed sector 29, so as to rotate pinion 28, and tachometer pointer shaft 9, thereby moving the index or pointer 10, to a point opposite the division on the dial face which represents the number of revolutions per minute then being given any shaft to which the governor shaft is properly connected as by flexible shaft through boss 15. When the speed is sufficient to have moved the index finger around to the limit of the scale the bevel faces 36, 36, on links 26, 26, will come to a bearing on the weights 27, and prevent further movement of the parts. These beveled faces also have a limiting action on the vertical swinging of the weights 27, 27, on their respective pivots before the above described stop action comes into effect. Contemporaneously with the tachometer action above described the counter mechanism 22, has been operated through gearing 23, to register the total number of rotations of the shaft to which the instrument is connected.

In case cleaning or repair, or the substitution of new parts, is necessary, the retaining ring 6, is removed, the index finger 10, and dial face taken off, and then by loosening the screws 17, the frame 11, with all the parts carried thereby, may be removed as a unit and the necessary cleaning, oiling, inspection or repairs made, after which the apparatus is put back in the case as a unit. This method of mounting also insures the accurate adjustment of all the parts with reference one to another and leaves that adjustment unaffected by expansion, contraction, or warping of the casing 1, or of the dial face.

Having described my invention, I claim:

1. A combined tachometer and counting mechanism mounted on a frame adapted to be inserted or removed as a unit from a proper casing having a dial face provided with a central opening and a horizontally extending opening, which mechanism comprises a frame having opposed bearings, a tachometer shaft journaled therein, rearwardly projecting spacing lugs on the frame adapted to bear against the back plate of the casing, and provided with fastening means thereto, and similar forwardly projecting lugs on said frame, a plate mounted on said last mentioned lugs and provided with an aperture adapted to register with the above mentioned dial face openings and with a perforation adapted to register with the central opening in the dial, a counting mechanism mounted on this plate behind said horizontally extending opening, a tachometer pointer shaft journaled in and projecting through the perforation in said plate, a centrifugal governor mechanism mounted on the tachometer shaft and geared to the pointer shaft, and gearing connecting the counting mechanism and the said tachometer shaft.

2. The tachometer and counting mechanism described in claim 1 combined with a cylindrical casing having a back provided with perforations registering with the rearwardly extending lugs on the main frame, a dial face having an opening registering with the aperture in the counter supporting plate, a glass cover for the casing, spacing means between the dial and glass cover, and a retaining ring for holding these parts assembled, together with an index hand mounted on the tachometer pointer shaft and located between the dial and the glass cover plate.

3. A centrifugal governor mechanism comprising in combination a rotatable shaft, a plurality of weights, a sliding sleeve on the shaft, and pairs of links pivoted to the shaft and sleeve at their outer extremities and to one another and to the weights at their inner extremities, the inner overlapping ends of the links having beveled outer faces adapted to bear against the weights when the weights have moved outward from the shaft a predetermined distance whereby the amplitude of movement of the governor mechanism is limited.

CLARENCE CARSON.

Witnesses:
ALMA M. O'NEILL,
M. H. BLACKWELL.